(12) United States Patent
Martin (10) Patent No.: US 12,023,765 B1
(45) Date of Patent: Jul. 2, 2024

(54) METHOD FOR STUD WELDING AND FASTENING METAL DECKING TO A STRUCTURAL FRAME AND METAL DECKING WITH BEAM LOCATOR OPENINGS AND COVERS

(71) Applicant: New Rule Products, Inc., St. Charles, MO (US)

(72) Inventor: Gerald D. Martin, St. Charles, MO (US)

(73) Assignee: New Rule Products, Inc., St. Charels, MO (US)

( * ) Notice: Subject to any disclaimer, the term of this patent is extended or adjusted under 35 U.S.C. 154(b) by 702 days.

(21) Appl. No.: 17/188,563

(22) Filed: Mar. 1, 2021

Related U.S. Application Data (60) Provisional application No. 62/983,623, filed on Feb. 29, 2020.

(51) Int. Cl.
  *B23K 9/20* (2006.01)
  *E04B 5/02* (2006.01)
  *E04B 5/10* (2006.01)
  *E04C 5/06* (2006.01)

(52) U.S. Cl.
  CPC .............. *B23K 9/202* (2013.01); *E04B 5/023* (2013.01); *E04B 5/10* (2013.01); *E04C 5/0645* (2013.01)

(58) Field of Classification Search
  CPC . B23K 9/202; E04B 5/023; E04B 5/10; E04C 5/0645; E01D 19/125
  See application file for complete search history.

(56) References Cited

U.S. PATENT DOCUMENTS

| | | | |
|---|---|---|---|
| 4,600,118 A | 7/1986 | Martin | |
| 5,704,815 A | 1/1998 | Shibata et al. | |
| 5,865,341 A | 2/1999 | Martin | |
| 7,146,920 B1* | 12/2006 | Ryan | E04B 5/026 52/177 |
| 7,451,893 B2 | 11/2008 | Martin | |
| 8,505,772 B2 | 8/2013 | Martin | |
| 8,507,824 B2 | 8/2013 | Martin | |
| 9,630,270 B2 | 4/2017 | Martin | |
| 2005/0011148 A1* | 1/2005 | Hwang | E01D 19/125 52/263 |
| 2007/0199277 A1* | 8/2007 | Martin | E04C 5/0645 52/750 |

(Continued)

*Primary Examiner* — Brian W Jennison
*Assistant Examiner* — Kristina J Babinski
(74) *Attorney, Agent, or Firm* — Grace J. Fishel (57) ABSTRACT

A composite floor structure with a new metal decking having openings over the theoretical center of underlying support I-beams which now allows top flanges of beams to be painted and a welding zone for stud shear connectors within the openings then cleaned of paint, galvanizing and contaminates. The openings, which include deck caps if needed, allow visual inspection regarding the deck being tight against the beam and are spaced across the metal decking to provide a desired number of stud shear connectors and facilitate finding the center of the I-beam, provide a clean weld surface and minimize arc blow, weld fumes, weld time and required weld current. The thickness of the deck is no longer limited, and neither are the number of sheets stacked upon one another. All of which provide increased safety, efficiency and quality assurance while helping to control risk management.

14 Claims, 12 Drawing Sheets

(56) References Cited

U.S. PATENT DOCUMENTS

2011/0219720 A1* 9/2011 Strickland ................ E04B 5/10
                                                                    52/655.1
2018/0135316 A1* 5/2018 Apostolopoulos ...... E04G 5/165
2019/0338515 A1* 11/2019 Vanker .................... E04C 2/326

* cited by examiner

METHOD FOR STUD WELDING AND FASTENING METAL DECKING TO A STRUCTURAL FRAME AND METAL DECKING WITH BEAM LOCATOR OPENINGS AND COVERS

BACKGROUND OF THE INVENTION

Field of the Invention

The present invention relates to metal decking with openings and covers and to improved methods for fastening the decking and welding studs to the structural frame members in composite construction.

Brief Description of the Prior Art

General Concerns with Traditional Composite Construction

Structural engineers who design traditional composite steel structures such as hospitals, low and high rise office buildings, stadiums, airports, steel bridges, etc. often require the structure's steel to be painted, galvanized or have some form of protective coating applied to the structures steel members before erection begins. A protective coating protects the structural steel frame from elements like moisture. Moisture lying on bare beams or girders can eventually cause rust, which can then weaken the integrity of the structure. It is critical for a structure's steel frame to remain intact over time.

Structural engineers may also remove up to 35% of the structure's steel by employing a method known as stud welding wherein stud shear connectors are welded to the horizontal beams. This process, more broadly known as "composite design", allows the strength of the concrete to be added to the strength of the steel, thus replacing the removed steel.

However, when utilizing the traditional stud welding method, the "upper flange" portion of the horizontal beams or girders must be in an original bare steel condition and void of any protective coating for optimum stud welding conditions. Any amount of mill scale, rust, paint overspray, painted surface, galvanizing, etc. on the upper flange or welding surface of the beam or girder is a contaminant to the optimum welding process and is traditionally out of sight through the decking. The metal decking thickness and the amount of galvanize which can vary over a sheet of floor decking also affects optimum stud welding conditions and the quality of the weld obtained. Another important factor affecting weld quality is whether the deck is down tight against the supporting I-beams as an air gap stops a sustaining arc during the stud welding cycle thus failing to accomplish an optimum weld.

Problems in Detail with the Traditional Method

Setting Steel That Is Not Painted Or Coated Completely And Protecting The Bare Surfaces From The Elements: Vertical columns left plain as they come from the factory will immediately begin to rust. To prevent rust, the columns may be painted, galvanized or coated with a material including fire proofing. The horizontal beams may also have a similar protection applied to them but "not onto a upper flange of the beam" for optimum weld possibilities because the upper flange should be free of mill-scale, rust, paint overspray by the fabrication shop, no galvanizing, no fire proofing, etc. so that the stud welding process will come the closest to producing a 100% cross sectional weld.

Laying Decking: A two to four person crew will lay individual pieces of decking. The weight or length of the decking determines the size of the crew. A problem occurs to a following crew once the decking is laid as the beams are no longer in view.

Flattening The Decking: The "roll formed decking" may not be naturally flat. However the decking needs to be flat and tight on the upper flange of the steel beam for subsequent fastening. But a worker cannot see through the decking and does not know if the decking is down tight.

Fastening The Decking: Typically a ⅝" puddle weld is a preferred method of fastening the decking to the beam. But with the beams out of view, a worker cannot confirm that a weld actually penetrated the metal decking all of the way and into the upper flange of the beam. Stepping on an improperly fastened decking without full ⅝" diameter puddle welds properly penetrating the beam can cause the decking to slip and a worker to fall to their death or receive serious injury.

Alternate Methods Of Fastening Composite Decking Versus Puddle Welding: An air compressor gun can be used to secure the decking but the gun is heavy and requires an air compressor, long air hoses, etc. A self-tapping screw gun is lighter and can also be used but the screws have trouble penetrating anything thicker than ¼" beam flange thickness and many composite beam thicknesses are from ⅜" thick to ¾" thick. A still further method makes use of a powder actuated decking fastener. The tool weighs over 26 pounds and it must be held perpendicular to the decking and is hard for an average worker ergonomically to operate over an 8 hour shift.

With each of the methods it is important that the decking be down tight to secure a good puddle weld or fastener placement.

Finding The Center Of Each Beam To Achieve Optimum Weld Results: Once the decking is laid, the beams supporting the decking are hidden and because of the "sweep" in these beams, a worker cannot verify the location of the center of the underlying beam. If a welder misses the center of the beam, "arc blow" may result in an incomplete, imperfect weld caused by welding away from a proper magnetic field over the center of the beam.

Guaranteeing A Clean Weld Surface: There is no present method to assure a clean weld surface on the upper flange of the beam as it comes to a job site. There will be a variety of mill-scale on every beam and the beam can easily start rusting immediately. If the lower portion of the beam is spray painted, there is no easy way to determine the amount of overspray on the upper flange. A stud welding machine is set to apply the same condition to every weld but every weld zone with different amounts of contamination is different. Therefore some welds will be too hot or long and some welds will be too short or cold. Since the ironworker cannot see below or the underside of the decking, the worker cannot accurately determine what happen in the weld. The traditional method of tapping on the welded stud and listening to its tone is not enough to determine weld quality.

Guaranteeing There Is Not Too Much Decking Thickness Or Galvanize For Optimum Weld Results: Galvanizing the decking with a G60 or G90 coating to prevent rusting is usually money well spent but the thickness of the galvanizing usually varies on the plus side across a sheet. Galvanizing is a contaminate for the stud welding process and with the variation in the galvanizing thickness, the welding zone differs from location to location making a consistent weld difficult to obtain. A thicker decking adds an additional degree of difficulty as it must be welded through before reaching the beam. Galvanizing fumes are also a contaminate for ironworkers to breath during the time they are bent over with unprotected faces within 24" to 30" of the weld zone during the welding process.

Reducing The Degree Of Difficulty To Obtain A Certified Weld That Replaces Up To 35% of The Structures Missing Steel. The traditional method of building a composite structure needs improvement regarding coating the upper flange of the structure's beams and increasing quality assurance regarding stud welding which replaces up to 35% of a composite structure's missing steel.

BRIEF SUMMARY OF THE INVENTION

In view of the above, it is an object of the present invention to provide the following benefits:
New Decking Design With Openings And Covers 1.) Allowing For A Completely Coated Horizontal Steel Beam Or Girder: The new design allows the structural steel beams or girders to be completely painted, galvanized or coated (including the never before permitted upper flange of the beam or girder), before the decking is installed, thus allowing the upper flange of the structural steel members to be protected from the elements.

2.) A New Decking Design with Openings Exposing The Horizontal Beams Upper Flange: The newly designed decking has specific openings punched or cut out of the traditionally solid decking design. The location of the openings in the decking can be predetermined by a structural engineer to allow a worker to immediately spot the desired location for shear studs and the approximate location for puddle welds, powder actuated fasteners, etc. The pre-formed openings eliminate the need for a worker to transfer notations off paper and into measurements on the decking. The new process saves time and adds structural integrity by eliminating possible error. The see through openings also allow a worker to note the surface condition and approximate center of the beam or girder in order for the worker to obtain optimum welding results. A properly welded shear connector is of paramount importance to eliminating 35% of the steel otherwise needed. The entire welding surface is visible to a worker and ready for proper surface preparation. The see through openings allow the worker to easily note that the deck either is, or is not, down tight on the underlying beam.

3.) Locating The Center Of The Horizontal Steel Beam For Optimum Stud Welding: Beams or girders may have a certain amount of "sweep" left or right that is hidden under a decking from a worker when fastening or welding decking or shear studs. Predetermined openings designed to expose the center of the beam or girder help expose the sweep in the structural steel member thus allowing the worker to find the beam's true center.

BRIEF DESCRIPTION OF THE SEVERAL VIEWS OF THE DRAWINGS

In the accompanying drawings, in which several of various possible embodiments of the invention are illustrated, in which.

DETAILED DESCRIPTION OF AT LEAST ONE PREFERRED EMBODIMENT OF THE INVENTION

Figure 1:
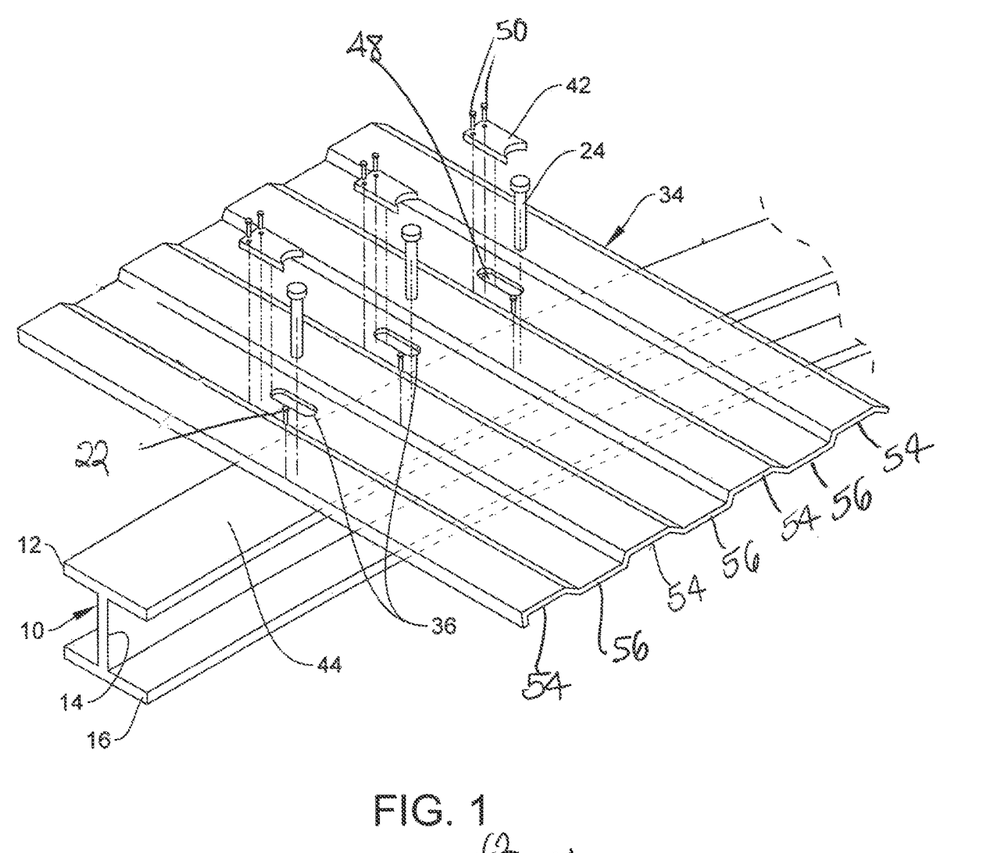
FIG. 1 is a perspective view of a composite floor structure in accordance with the present invention demonstrating an underlying I-beam with a sweep.

Referring to the drawings more particularly by reference character as shown in FIG. 1, a composite floor structure in accordance with the present invention includes metal decking panels 34 with a plurality of longitudinally oriented hollow ribs 54 disposed in generally parallel spaced relationship with a flat panel section 56 disposed between adjacent ribs. A reverse or inverted rib may be provided in the center of flat panel section 56 and on ribs 54 also for strengthening but has been omitted from the drawings for clarity.

Figure 5:
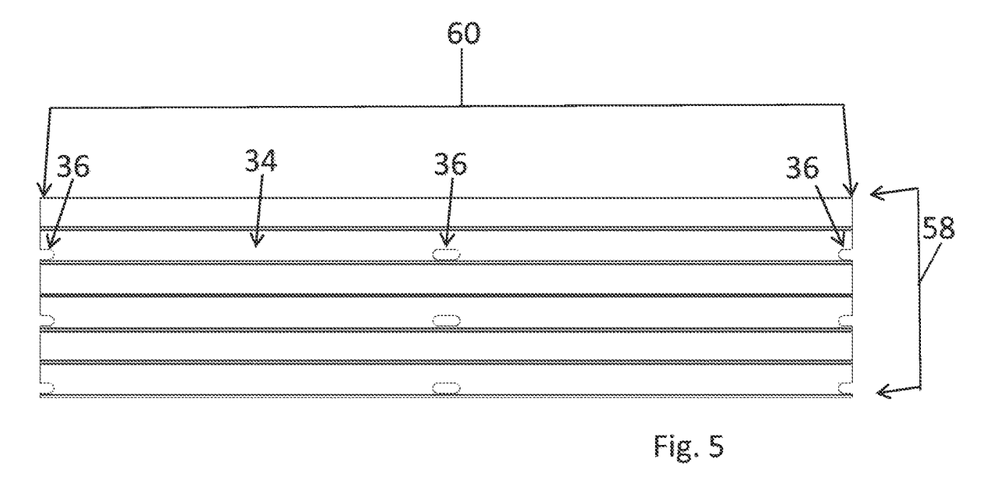
FIG. 5 is an overhead view of a single sheet of the new decking which has see-through openings strategically placed where the center of the beams should be. This allows the worker to see the traditionally hidden beams true position and find the actual center of the beam so that the stud welding crew may obtain optimum welds over the web of a upper flange of the beam.
Figure 6:
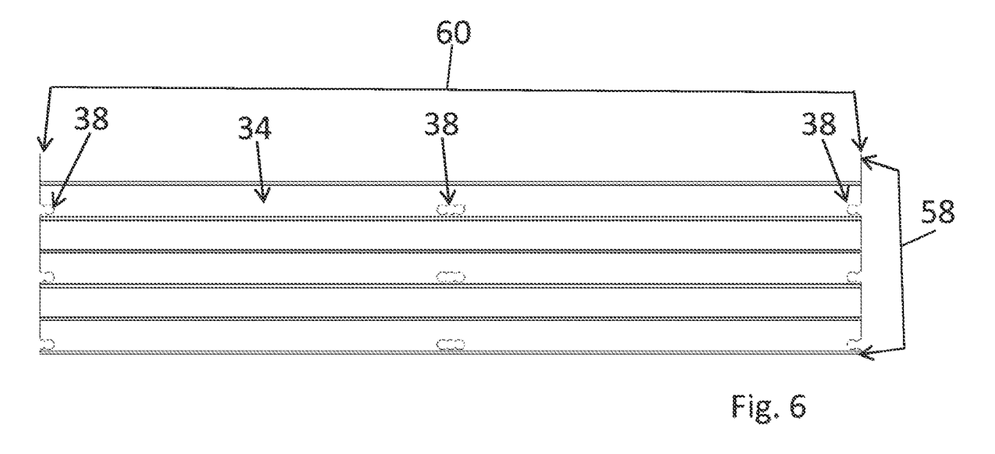
FIG. 6 is an overhead view of the new single sheet of decking with an alternate set openings having overlapping circles that are slightly larger than the stud welding ferrule, which allows the worker to pick the circle closest to the web of the beam.
Figure 7:
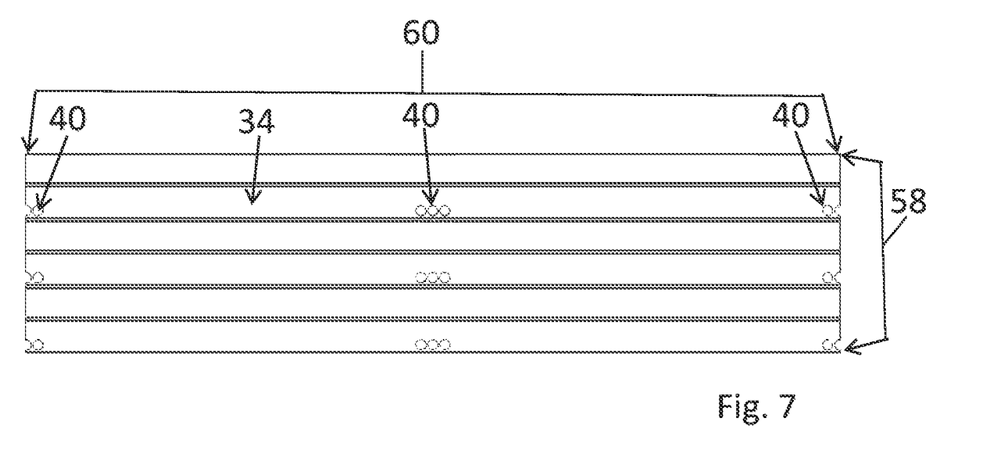
FIG. 7 is an overhead view of the new single sheet of decking with openings having a series of independent circles that are slightly larger than the stud welding ferrule, which allows the worker to pick the circle closest to the web of the beam. Squares, rectangles and other shapes could also be used to create the desired opening.
Figure 8:
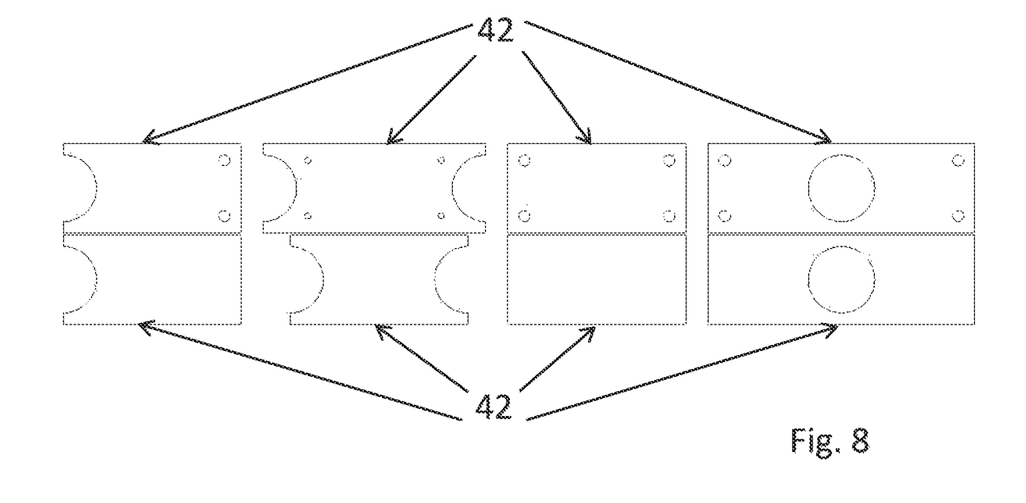
FIG. 8 is an overhead view of various types of flat metal covers or "caps" that will cover openings in the decking once the stud shear connectors have been welded. These covers or caps may match the thickness of the decking and may be plain or galvanized and can be fastened with adhesive, fasteners, welding or other methods.

As shown in FIGS. 5-7, metal decking panel 34 has opposing width sides 58 and opposing length sides 60 and may be provided in different widths, typically 24" or 36", and different lengths, typically 20' or 30' lengths, but other widths and lengths may be used. Metal decking panel 34 is typically formed of 16 to 22 gauge steel and 20 and 22 gauge panels and plain, galvanized or painted. Length side 60 of each decking panel 34 will nestle into the next panel for a continuous floor construction without wasting any material. In an illustrative but non-limiting example, a 24" panel, ribs 54 may be 4¾" wide with a center reinforcing rib that is ¾" wide and ½" high. The flat panel sections 56 may also be 4¾" with a center rid that is ¾" wide and ½" high·h.

Figure 9:
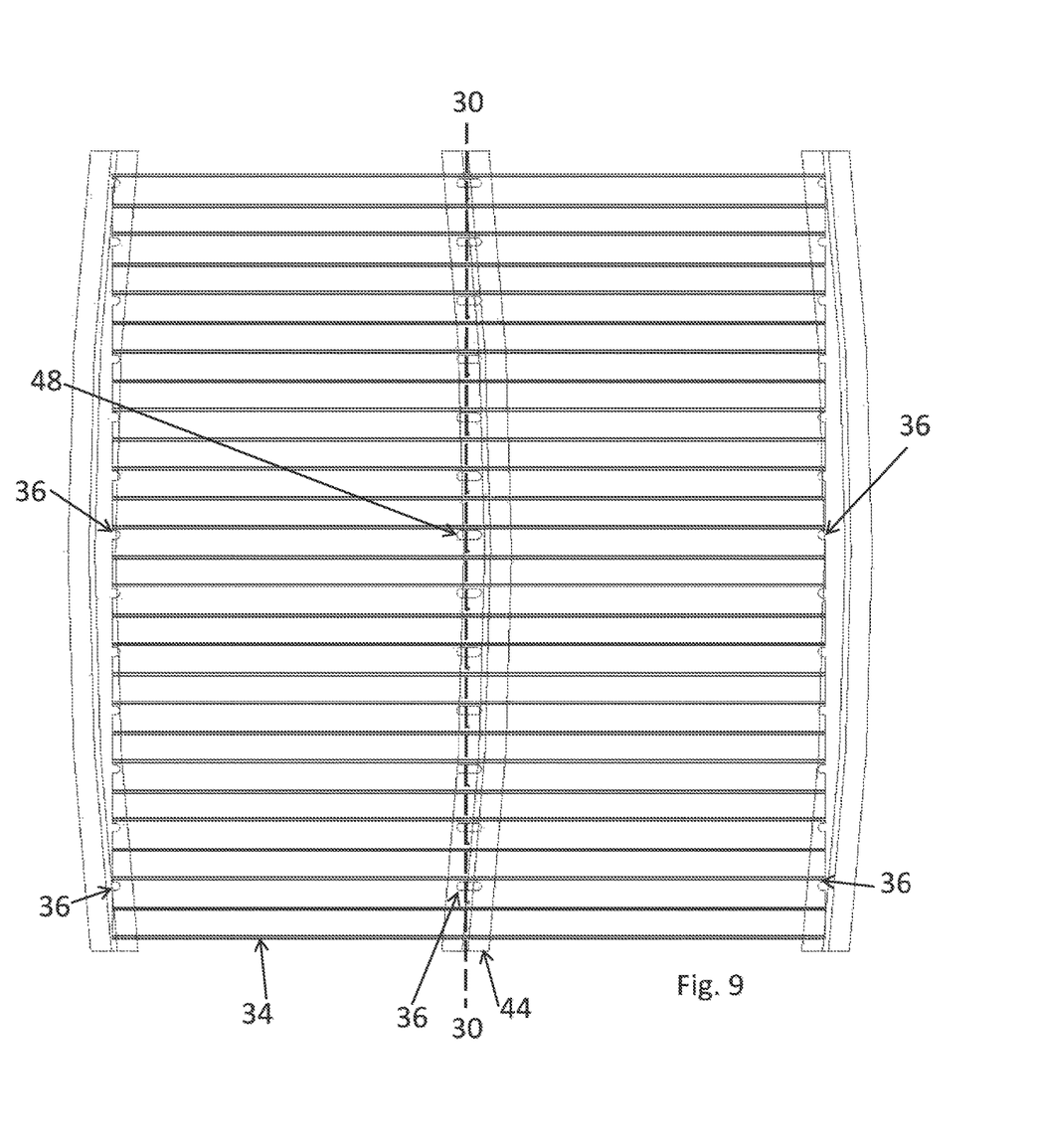
FIG. 9 is an overhead view showing newly painted beams covered with several sheets of the new decking laid in place and fastened to the steel beams over the center or web of the beam which as illustrated may have an exaggerated sweep. Another crew of workers can then grind and clean the upper flange of the beam over the web to assure optimum welding conditions.
Figure 10:
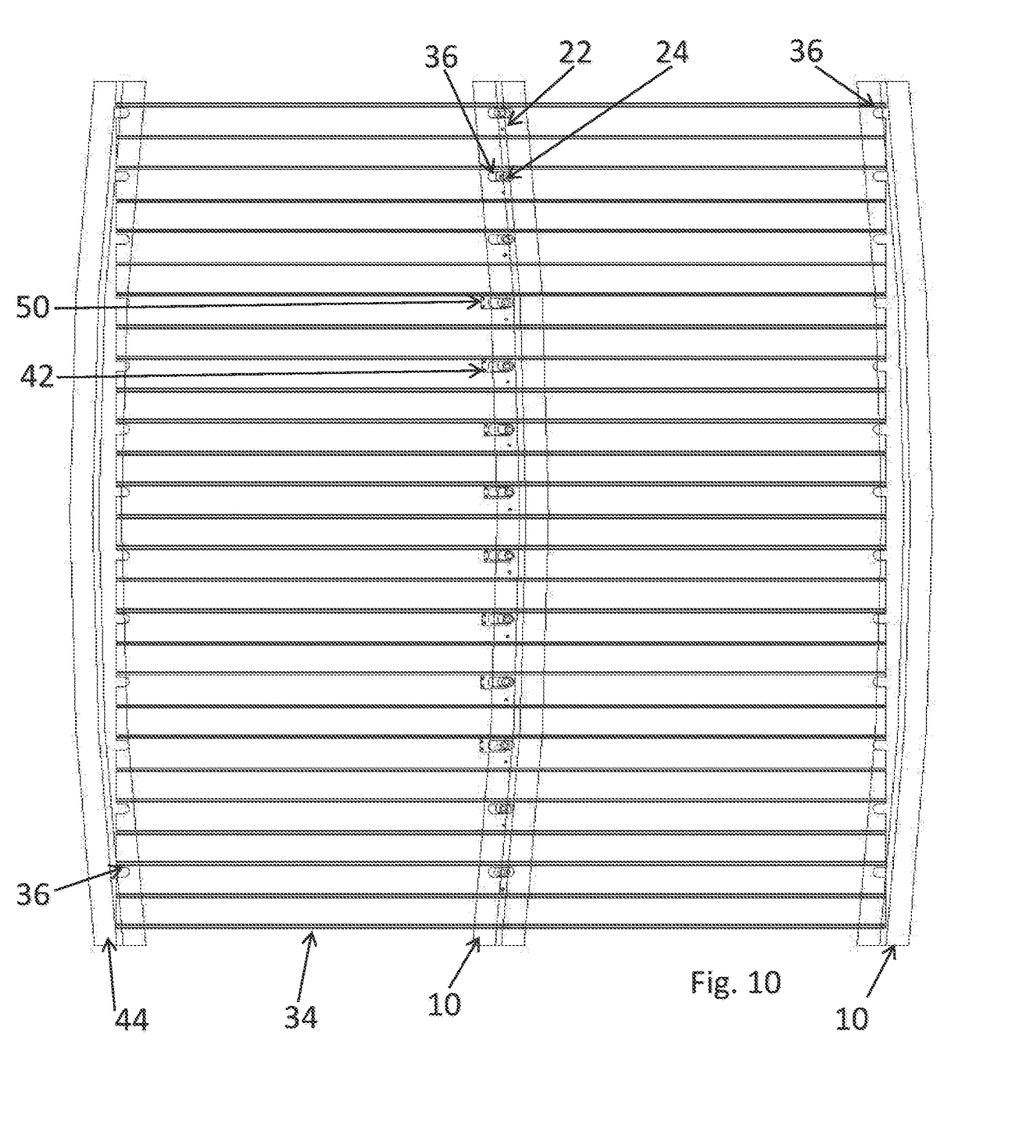
FIG. 10 is an overhead view of the stud shear connectors welded in place onto the freshly cleaned welding surface over the center flange of the beam. The opening is covered with a cover which is secured appropriately.
Figure 11:
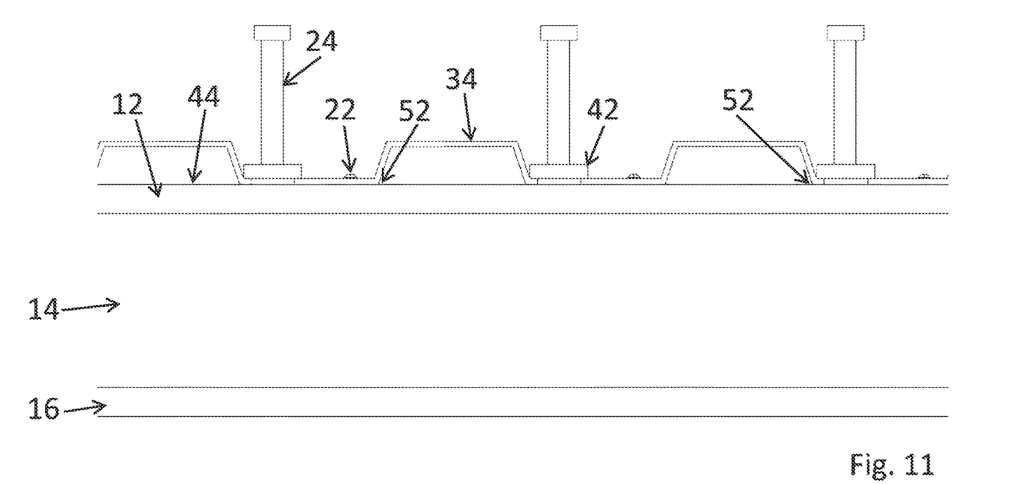
FIG. 11 is a side view depicting the horizontal beam and its lower flange, web, and upper flange of the beam with the new decking secured tightly to the upper flange of beam which may be painted, coated, galvanized, etc. The upper flange of the center web area of the beam has been cleaned, the studs have been welded, and an adhesive cover has been installed to cover the remaining opening.
Figure 12:
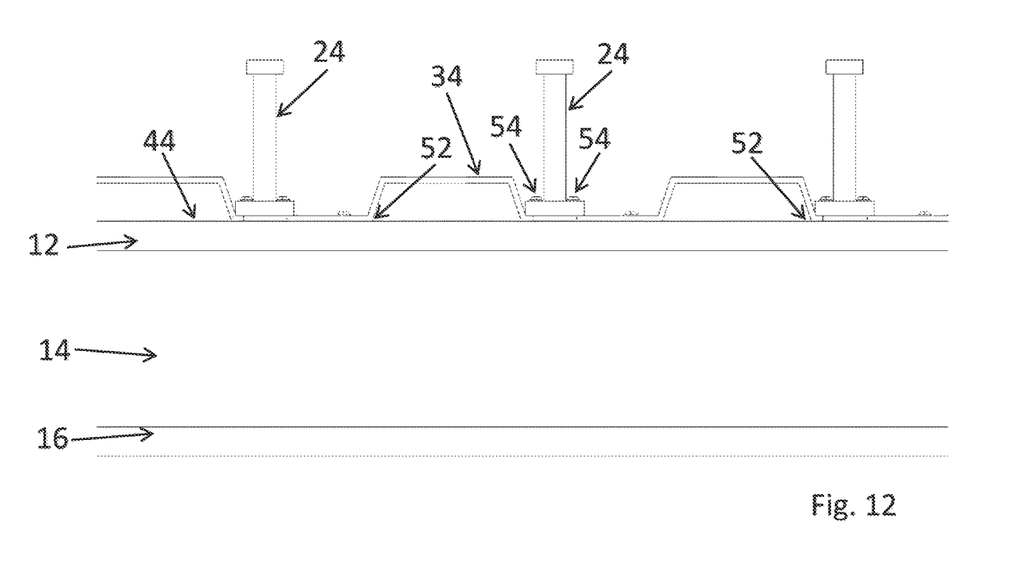
FIG. 12 same as FIG. 11 only this time covers are used that have no adhesive and are securely fastened with screws. Several methods could be used to secure the covers through the decking and into the upper flange of the beam.

Turning to FIGS. 9-10 an underlying I-beam 10 positioned transversely the ribs 54 along the width sides 58 and at least one I-beam 10 is positioned transversely the ribs along the length side 60. Each of said I-beams 10 has an upper flange 12, web 14 and lower flange 16. Upper flange 12 is in underlying supporting contact with the flat panel sections 56 of metal decking panels 34. I-beams 10 are formed of steel and may be coated with mill scale, rust, paint, insulation, galvanizing or the like. In the example shown in the drawings, upper and lower flanges are 8" wide.

Figure 4:
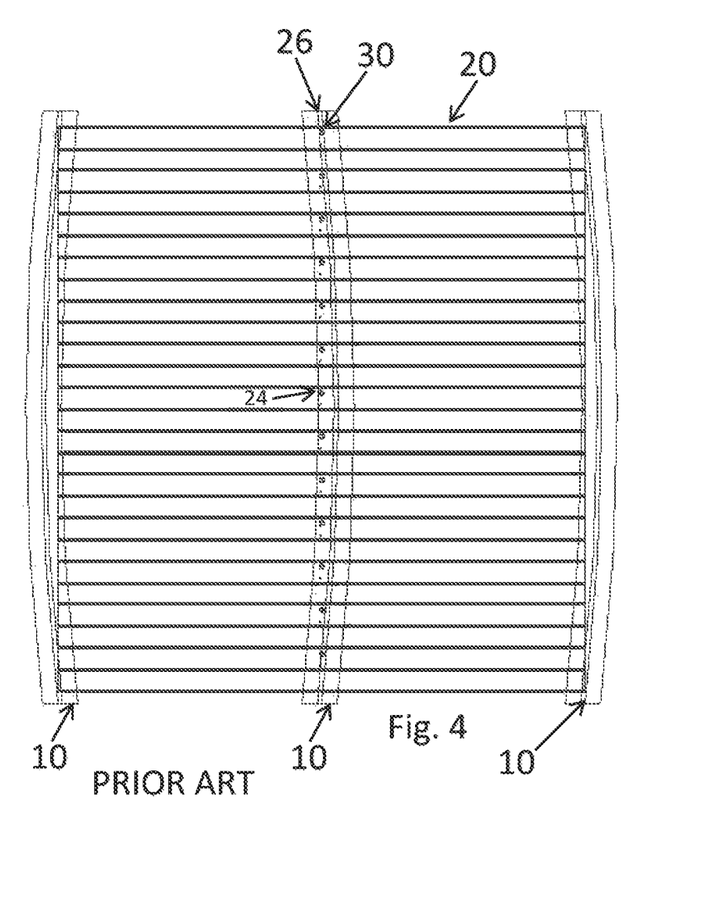
FIG. 4 is an overhead view depicting where the horizontal beam actually is under the decking and is a perspective of the true curve of the beam, which is known as an allowable amount of beam "sweep". In the traditional method of installing a composite floor decking, the beam's center cannot be seen by the welding crew.

Flat panel sections 56 have a plurality of openings 36 engineered to align with a theoretical centerline 30 of each of the underlying I-beams 10 when straight. Openings 36 are punched, cut or otherwise formed in decking panels 34 of different shape as shown in FIGS. 4-6. Each of openings 36 must be sized such that a stud 24 and a supporting ferrule may be passed through. With I-beams 10 having a 8" wide upper flange 12, openings 1½" by 2½" have been found satisfactory as has a 1½" circle or a 1½" by 2½" oval. Openings 36 may be 0.9" in diameter and in those instances when the ferrule sits upon the top of the deck during welding material in the beam, stud and deck are integrated.

Composite floor structure further includes a means for securing the decking flush with the underlying I-beams adjacent each of the openings. Typically attachment means 22 is a ⅝" puddle weld but screw, air or powder actuated fasteners may be used.

After decking panels 34 have been tightly attached 52 to underlying beams 10, upper flange 12 of each beam is cleaned of mill scale, rust, paint or galvanizing through openings 36. This may be accomplished with an abrasive wheel, wire brush or wheel, drill burr, end mill or the like.

Figure 2:
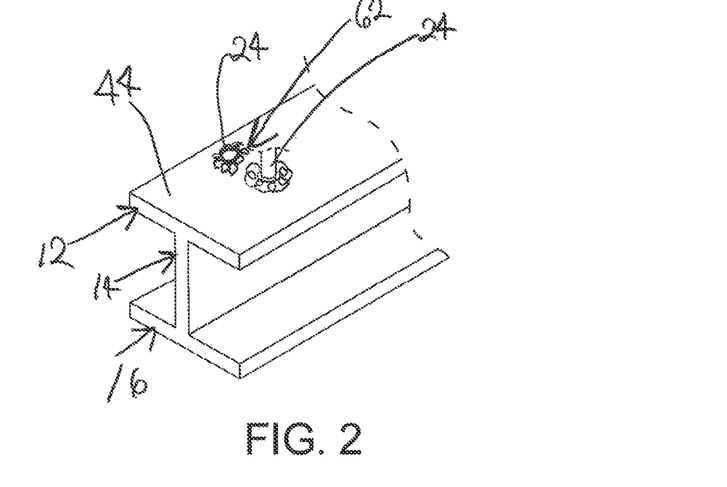
FIG. 2 is perspective view of an I-beam demonstrating the effect of arc blow on fillet formation during stud welding.
Figure 3:
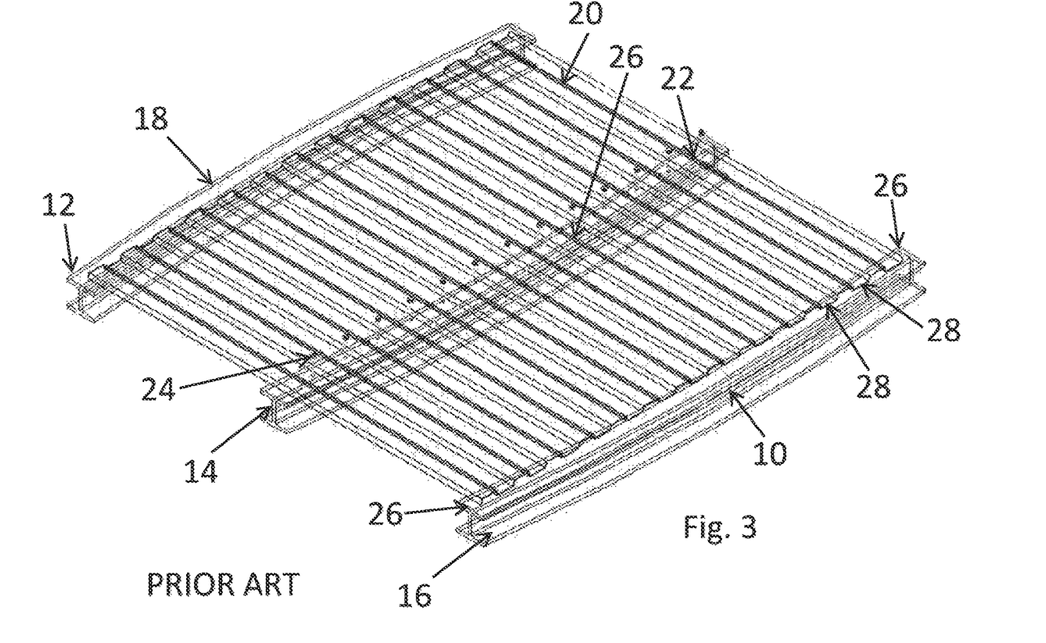
FIG. 3 is a perspective view of a traditional method of composite steel erection showing the horizontal steel beams (which must have a bare upper flange). These are then covered with the traditional composite floor decking that must be securely resting tightly on the upper flange of the beam. The decking is typically fastened with ⅝" puddle welds through the decking and into the upper flange of the horizontal beam. After the decking is properly fastened then another crew stud welds the required number of stud shear connectors in place through the decking and into the center web of the upper flange of the beam.

When I-beams 10 have a sweep as shown in FIGS. 9-10, the openings which are engineered to be on centerline may not be centered on the I-beams. Presently the usual sweep is about ½" in a 40' beam but in years past it was greater. By visual inspection of I-beams 10 through openings 36 an operator may determine the centerline of the beam for attachment of stud 24. Edge distance of stud 24 on upper flange 12 can influence weld quality due to arc blow. As shown in FIG. 2, arc blow results in a lack of weld fillet 62 on the periphery of stud 24 opposite the direction of the arc blow. By locating the center of I-beam and preventing arc blow the strength and quality of the weld is improved. Welding on the center may also take less time and energy. Removal of contaminates in the weld zone on upper flange 12 removes the majority of toxic weld fumes which ergonomically benefits an ironworker, particularly when I-beams 10 are galvanized.

In some cases the sweep of I-beams 10 may be sufficient that openings 36 overhang upper flange 12 of the supporting beam 10 as shown in FIG. 10. To prevent concrete from flowing through the gap, a cover 42 is provided. Cover 42 may be attached to decking panel 34 with adhesive or fasteners. If openings 36 do not overhang upper flange 12, openings may be blocked with covers 42 if desired or left open.

The following is a list of reference numbers shown in the drawings. However, it should be understood that the use of these terms is for illustrative purposes only and use of reference numbers correlating a certain term that is both illustrated in the drawings and present in the claims is not intended to limit the claims to only cover the illustrated embodiment:

10 Horizontal beam, 12 upper flange of beam, 14 web of beam, 16 lower flange of beam, 18 bare surface of upper flange of beam from factory (includes various amounts of mill scale, rust, overspray and other contaminates), 20 traditional composite floor decking, 22 traditional ⅝" puddle weld, screw, air or powder actuated fastening method, 24 stud shear connector, 26 unknown (unseen) center line (may vary from required straight line), 28 distance between lower of decking and upper flange of beam (must be tight—no gap), 30 theoretical straight beam line for fastening and welding (may not compare to actual web of beam due to beam "sweep"), 34 composite floor decking of the invention—single sheet, 36 see through openings (shown as slots but may have other shapes), 38 overlapping circles versus slots for openings 36, 40 individual circles versus slots for openings 36, 42 covers for openings 36 attached with adhesive or fasteners, 44 painted or coated upper flange of horizontal beam, 46 exposed upper flange in opening 36 ground clean for welding, 48 unwanted see through area caused by bean sweep, 50 fasteners to secure covers if needed, 52 distance between lower of decking and upper flange of beam is tight, 54 longitudinally oriented hollow ribs, 56 flat panel section between adjacent ribs, 58 width side of decking panel, 60 length side of decking panel, 62 malformed fillet because of arc blow.

In Use how the New Equipment Will Work in the Field

Figure 13:
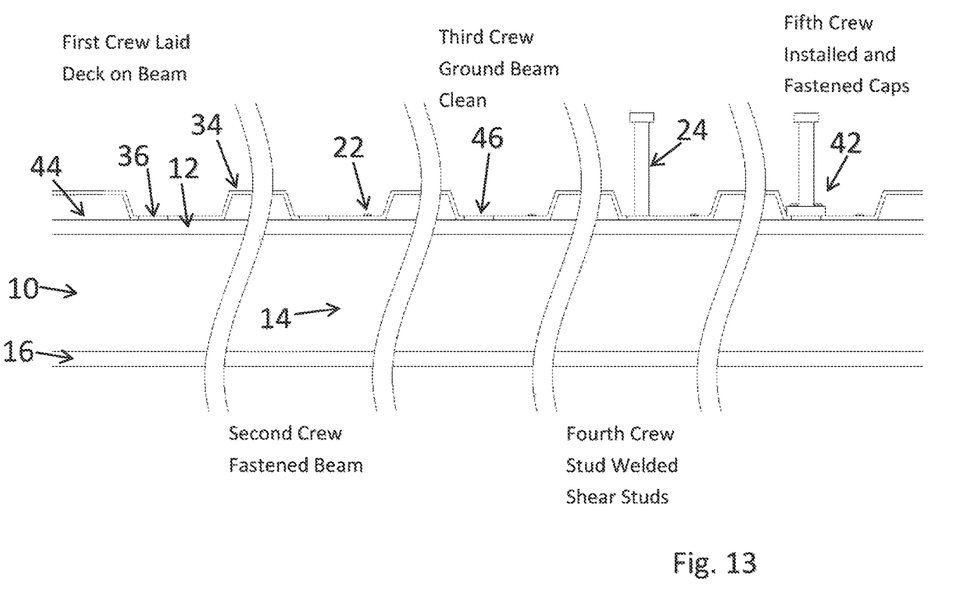
FIG. 13 depicts a summary of the work done by various crews

Turning now to FIG. 13:

First Crew: A crew will lay down single sheets of decking 34 at a time on upper flange of the I-beams to form a composite floor decking. For now, this process remains the same as traditional. Please note that this new decking is no harder to install, nor does it take any longer to accomplish than the traditional method of laying decking does. In fact, it is believed that the overall process easier to complete and with a much higher level of quality assurance.

Second Crew: The workmen may continue to use the traditional method of puddle welding a ⅝" diameter puddle weld to fasten 22 the decking. But that requires a welding machine with long weld cables and ground cable, etc. However in the traditional method, the worker cannot be positive that there was a full or complete ⅝" puddle weld penetration on each and every weld, etc. to the hidden beam.

With see-through slots 36, fastening of the decking panel 34 is more efficient with better quality. A worker can confirm that the distance 52 between the lower of the decking and upper flange is tight.

Third Crew: This would be an additional crew compared to the traditional method and is part of the new design. In it, another worker will grind the area over the center flange of the beam and inside the opening 36 to clean and remove any residual contaminates and prepare the weld zone for a perfect weld.

Fourth Crew: The next crew will place the ferrules and stud into through openings 36 and weld the stud shear connectors 24 to the I-beam. Because the welder does not have to burn through the limited thicknesses of decking and the galvanize coating on the decking approximately 30% less weld current is required and the weld time is about 30% shorter, thus reducing production and repair cost, etc. Weld quality is far superior on clean steel than through galvanized decking.

Fifth Crew: One ironworker will place the desired covers 42 over any voids showing through the steel and fasten the covers with fasteners 50.

In view of the present disclosure, among the differences to the traditional process of laying a decking, fasting the decking and welding stud shear connectors may be mentioned:

1. The upper flange of the horizontal beam may be painted, galvanized or coated.

2. The new decking has openings through which the true beam center may be determined.

3. Decking thickness is not limited to 16 to 22 gauge and several layers of decking may be stacked. Because of the traditional composite constructions need to "weld through decking", the structural engineers are presently limited to the thickness of decking they can use, which in turn limits their options regarding the steel structures other components and the structures configuration. With heavier decking in the subject new method, lighter steel structures may be designed with more or fewer shear studs, etc.

4. Nearly all weld contaminates in the openings are removed from the I-beam for superior welding and deck fastening.

5. Weld time and amount of required weld current is reduced by approximately 30%. The traditional method of welding stud shear connectors through galvanized steel decking requires about 30% more time and current to weld through the metal decking and overcome an unknown amount of weld contaminates and gaps between the lower of the decking and upper of the beam. With the current process, the stud shear connector is welded directly to the beam with a clean weld surface and no mill scale, rust paint or galvanizing contaminates and the deck is tight to the center of the beam.

6. The traditional method of welding stud shear connectors to horizontal beams requires each worker to place his face in close proximity to toxic weld fumes caused from welding for an extended period of time into and through G90 galvanized metal decking and other possible contaminates like mill scale, rust, overspray from primer, paint, fireproofing spray, etc. With present method, nearly all toxic galvanized and other weld fumes have been eliminated.

In view of the above, it will be seen that the several benefits of the invention noted above are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed:

1. A composite floor structure configured for supporting a layer of poured concrete comprising a metal decking with a plurality of longitudinally oriented hollow ribs disposed in generally parallel spaced relationship with a flat panel section disposed between adjacent ribs, said decking having opposing width sides and opposing length sides an underlying I-beam positioned transversely the ribs along the width sides and at least one I-beam positioned transversely the ribs along the length side, each of said I-beams having an upper flange in underlying supporting contact with the flat panel sections of the metal decking, said flat panel sections having a plurality of openings positioned to align with a centerline of each of the underlying I-beams when straight, said flat panel sections secured flush with the underlying I-beams adjacent each of the openings, each of said openings configured to receive a stud shear connector with a ferrule, each of said stud shear connectors welded on centerline of the underlying I-beam, said openings spaced across the decking to provide a desired number of the stud shear connectors.

2. The composite floor structure of claim 1 wherein an upper flange in each of the underlying I-beams is cleaned of any mill scale, rust, paint or galvanizing through the openings.

3. The composite floor structure of claim 1 wherein the ergonomic means for securing the decking flush with the underlying I-beams is a puddle weld or a fastener.

4. The composite floor structure of claim 2 wherein the metal decking is formed of steel of unlimited thickness.

5. The composite floor structure of claim 4 wherein the 20 or 22 gauge metal decking decking is stacked to whatever degree wanted.

6. The composite floor structure of claim 1 wherein the openings are prepunched or cut into the decking.

7. The composite floor structure of claim 6 wherein the openings are 1½" by 2½" when the top flange on the I-beams are 8" wide.

8. The composite floor structure of claim 3 wherein the width sides of the decking are 24" or 36" and the length sides are 20' or 30' and each flat panel section has a center longitudinal reinforcing rib.

9. The composite floor structure of claim 1 wherein the underlying I-beams have a sweep and the openings in the flat panel sections overhang the upper flange of at one of the underlying I-beams, said composite floor structure further comprising a cover shaped to block each opening overhanging the upper flange.

10. The composite floor structure of claim 9 wherein the cover is shaped to fit around the stud shear connectors.

11. The composite floor structure of claim 9 wherein the covers are attached with adhesive or fasteners.

12. A method for finding the center of an underlying beam in a composite floor structure with a metal decking configured for supporting a layer of poured concrete, said metal decking having a plurality of longitudinally oriented hollow ribs disposed in generally parallel spaced relationship with a flat panel section disposed between adjacent ribs, said decking having opposing width sides and opposing length sides and an underlying I-beam positioned transversely the ribs along the width sides and at least one I-beam positioned transversely the ribs along the length side, each of said I-beams having an upper flange in underlying supporting contact with the flat panel sections of the metal decking, said flat panel sections having a plurality of openings positioned to align with a centerline of each of the underlying I-beams when straight, said method comprising visualizing each beam through the openings to determine the actual center of the beam and compensate for sweep.

13. A method for providing a clean weld surface for attachment of a stud in a composite floor structure with a metal decking configured for supporting a layer of poured concrete, said metal decking having a plurality of longitudinally oriented hollow ribs disposed in generally parallel spaced relationship with a flat panel section disposed between adjacent ribs, said decking having opposing width sides and opposing length sides and an underlying I-beam positioned transversely the ribs along the width sides and at least one I-beam positioned transversely the ribs along the length side, each of said I-beams having an upper flange in underlying supporting contact with the flat panel sections of the metal decking, said flat panel sections having a plurality of openings positioned to align with a centerline of each of the underlying I-beams when straight, said method comprising cleaning an upper flange of each of the underlying beams through the openings.

14. A method for minimizing arc blow in attaching a stud to an I-beam in composite floor structure with a metal decking configured for supporting a layer of poured concrete, said metal decking having a plurality of longitudinally oriented hollow ribs disposed in generally parallel spaced relationship with a flat panel section disposed between adjacent ribs, said decking having opposing width sides and opposing length sides and an underlying I-beam positioned transversely the ribs along the width sides and at least one I-beam positioned transversely the ribs along the length side, each of said I-beams having an upper flange in underlying supporting contact with the flat panel sections of the metal decking, said flat panel sections having a plurality of openings positioned to align with a centerline of each of the underlying I-beams when straight, said method comprising visualizing each beam through the openings to determine the actual center of the beam and welding the stud on centerline the beam.

* * * * *